Feb. 17, 1925.

P. PABIAN

ANIMAL TRAP

Filed May 6, 1924

1,526,866

INVENTOR
Paul Pabian.
BY
ATTORNEY

Patented Feb. 17, 1925.

1,526,866

UNITED STATES PATENT OFFICE.

PAUL PABIAN, OF TRENTON, NEW JERSEY.

ANIMAL TRAP.

Application filed May 6, 1924. Serial No. 711,319.

*To all whom it may concern:*

Be it known that I, PAUL PABIAN, citizen of Poland, residing at Trenton, in the county of Mercer and State of New Jersey, have invented certain new and useful Improvements in Animal Traps, of which the following is a specification.

This invention relates generally to animal traps which may be used in catching rats, mice, or other animals, the invention having for an object the provision of a novel trap of this sort which renders the bait more readily accessible to the animal.

For further comprehension of the invention, and of the objects and advantages thereof, reference will be had to the following description and accompanying drawing, and to the appended claims in which the various novel features of the invention are more particularly set forth.

Figure 1:
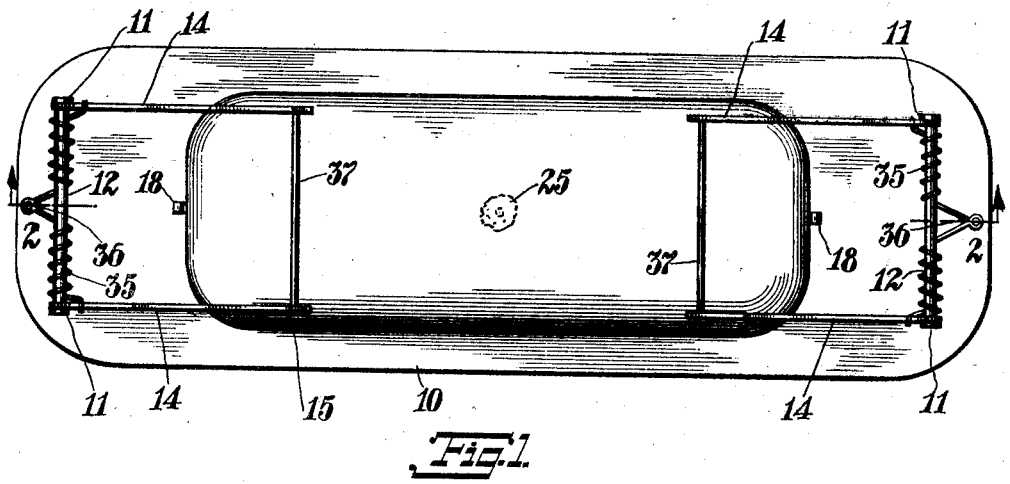

Fig. 1 of the drawing is a plan view of my improved trap.

Figure 2:
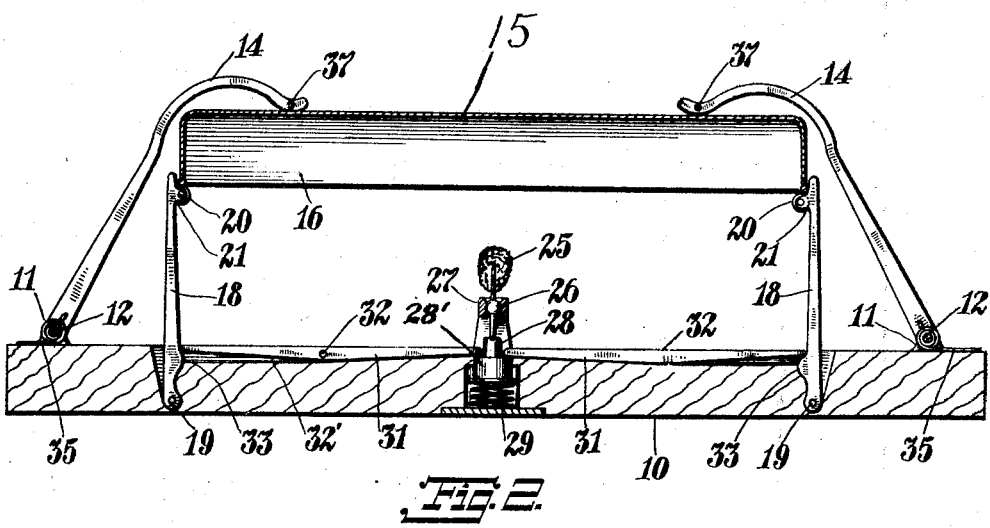

Fig. 2 is a longitudinal vertical sectional view taken on the line 2—2 of Fig. 1.

As here embodied my improved trap comprises an elongated rectangular base 10 which has mounted thereon toward the opposite ends thereof the pairs of lugs or ears 11 which support the hinge rods 12. Hinged on these rods are the pairs of arms 14 which extend upwardly toward one another when the trap is set, and which bear downwardly at or adjacent their free ends on the opposite ends of a cover member 15 of slightly less dimensions in plan view than the base 10, and which is here shown as provided with a depending peripheral flange 16 of suitable depth.

The cover member 15 is supported when the trap is set at a sufficient distance above the base 10 to permit of the animal passing thereunder for access to the bait, by a pair of arms 18 which are hinged at their lower ends as at 19 to the base and which have the said cover resting thereon at or near their upper ends. As here shown each arm 18 has a roller 20 mounted on the side thereof at a short distance below its upper end and the bottom of the flange 16 rests in the slight depression formed between the top of the roller and of the ears or lugs 21 in which it is supported.

The bait is adapted to be located centrally of the base 10 and may be attached to the upper end of a spindle 25 which has a universal joint mounting on the base 10, the spindle being here shown as formed with a ball enlargement 26 between its ends which engages in a complementary socket member mounted on the base 10. When the trap is set the lower end of the spindle 25 bears on the top end of a plunger member 28 which is carried in the base 10 in alinement with the spindle and which is pressed upwardly by means of an expansion spring 29 located in the base under the plunger. The plunger is formed between its ends with a shouldered element 28' over which engage the ends of the levers 31 which are fulcrumed midway between their ends as at 32 in suitable slots 32' in the base along which latter they extend with their top edges normally flush with the top surface of the base. The other ends of these levers project into operative relation with cam projections 33 from the arms 18 so that when these levers are rocked by the upward movement of the plunger, the arms 18 are swung in a direction to disengage them from the cover 15 and allow the latter to be pressed down on the base by the arms 14. These arms 14 are normally urged downward by means of springs 35 coiled around their hinge rods 12 and secured midway between their ends as at 36 to the base and at their ends to the respective arms of each pair. The free ends of these arms 14 may be united by means of the rods 37 to cause both arms to move in unison.

When the trap is set the parts occupy the position shown in Fig. 2, with the cover 15 supported on the arms 18, and the bait spindle or trigger 25 holding the plunger 28 depressed. When the animal seizes the bait the trigger moves from engagement with the plunger and the spring 29 throws the latter upward, causing the levers 31 to be rocked and the arms 18 moved to free the cover, which is moved down on the base by the arms 14.

While I have illustrated and described a preferred embodiment of my invention it is to be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:—

1. An animal trap comprising a base, arms hinged to said base near opposite ends thereof, a cover member adapted to be pressed against said base by said arms, and bait controlled abutment supports for said cover retaining the latter spaced at a distance above said base.

2. An animal trap comprising a base, arms hinged to said base near opposite ends thereof, a cover member adapted to be pressed against said base by said arms, and bait controlled abutment supports for said cover retaining the latter spaced at a distance above said base, said supports being in the form of arms hinged to said base.

3. An animal trap comprising a base, arms hinged to said base near opposite ends thereof, a cover member adapted to be pressed against said base by said arms, and bait controlled abutment supports for said cover retaining the latter spaced at a distance above said base, said supports being in the form of arms hinged to said base, rock-levers adapted to engage said arms to move the latter to inoperative position, a plunger mounted in said base and adapted to rock said levers, and a bait trigger holding said plunger against movement.

4. An animal trap comprising a base, arms hinged to said base near opposite ends thereof, a cover member adapted to be pressed against said base by said arms, and bait controlled abutment supports for said cover retaining the latter spaced at a distance above said base, said supports being in the form of arms hinged to said base, rock-levers adapted to engage said arms to move the latter to inoperative position, a plunger mounted in said base and adapted to rock said levers, and a bait trigger holding said plunger against movement, said bait trigger being in the form of a spindle having a universal joint mounting on the base in normal alinement with said plunger.

5. An animal trap comprising a base, arms hinged to said base near opposite ends thereof, a cover member adapted to be pressed against said base by said arms, and bait controlled abutment supports for said cover retaining the latter spaced at a distance above said base, said supports being in the form of arms hinged to said base, rock-levers adapted to engage said arms to move the latter to inoperative position, a plunger mounted in said base and adapted to rock said levers, and a bait trigger holding said plunger against movement, and a spring bearing on said plunger to urge it in a direction to rock the said levers.

6. An animal trap comprising a base, arms hinged to said base near opposite ends thereof, a cover member adapted to be pressed against said base by said arms, and bait controlled abutment supports for said cover retaining the latter spaced at a distance above said base, said supports being in the form of arms hinged to said base, rock-levers adapted to engage said arms to move the latter to inoperative position, a plunger mounted in said base and adapted to rock said levers, and a bait trigger holding said plunger against movement, and a spring bearing on said plunger to urge it in a direction to rock the said levers, said plunger having a shouldered element over which the ends of said levers project.

In testimony whereof I have affixed my signature.

PAUL PABIAN.